United States Patent [19]

Jahns et al.

[11] Patent Number: 5,058,727
[45] Date of Patent: Oct. 22, 1991

[54] CONVEYOR APPARATUS

[75] Inventors: Werner Jahns, Seligenstadt; Heinz Uecker, Offenbach, both of Fed. Rep. of Germany

[73] Assignee: Mannesmann AG, Düsseldorf, Fed. Rep. of Germany

[21] Appl. No.: 376,821

[22] Filed: Jul. 7, 1989

[30] Foreign Application Priority Data

Jul. 8, 1988 [DE] Fed. Rep. of Germany ....... 3823657

[51] Int. Cl.⁵ ............................................. B65G 47/26
[52] U.S. Cl. .................... 198/460; 198/572; 198/575; 198/577
[58] Field of Search ............... 198/460, 571, 572, 575, 198/577

[56] References Cited

U.S. PATENT DOCUMENTS

| | | | |
|---|---|---|---|
| 3,512,662 | 5/1970 | Strydom | 198/572 X |
| 4,227,607 | 10/1980 | Malavenda | 198/460 |
| 4,236,631 | 12/1980 | Bowen et al. | 198/583 X |
| 4,240,538 | 12/1980 | Hawkes et al. | 198/460 X |
| 4,439,728 | 3/1984 | Rickman, Jr. | 324/164 |
| 4,629,982 | 12/1986 | Kieslich | 324/208 |
| 4,633,148 | 12/1986 | Prucher | 318/135 |
| 4,688,025 | 8/1987 | Frank | 340/571 |
| 4,782,701 | 11/1988 | Proctor, Jr. | 73/587 |
| 4,820,938 | 4/1989 | Mix et al. | 307/117 |

FOREIGN PATENT DOCUMENTS

| | | | |
|---|---|---|---|
| 0000359 | 9/1979 | Japan | 198/572 |
| 0119647 | 9/1980 | Japan | 198/572 |
| 0075311 | 6/1981 | Japan | 198/572 |

*Primary Examiner*—D. Glenn Dayoan
*Attorney, Agent, or Firm*—Nils H. Ljungman & Associates

[57] ABSTRACT

This invention relates to a conveyor apparatus or roller train with a series of conveyor stations, the support rollers of which can be optionally driven or shut off. To create an economical and reliable roller train with a separation and storage function, each conveyor station of the roller train has its own drive motor with a switchgear unit and the several switchgear units are connected together for control purposes into a cascade so that only the first switchgear unit of the cascade is connected to a higher-voltage switch cabinet.

1 Claim, 4 Drawing Sheets

CONVEYOR APPARATUS

BACKGROUND OF THE INVENTION

1. Field of the Invention

This invention relates to a conveyor apparatus in the form of a roller train with a series of conveyor stations, the support rollers of which can be optionally driven or shut off.

2. Description of the Prior Art

On a roller train as disclosed by German Utility Model No. 18 70 780, all the support rollers of a roller train are driven by a common belt which runs along and underneath the support rollers; the individual storage stations can be shifted into the idle mode by lowering the belt. The item being transported on the roller train, however, is not held, and can roll along or off of the idle section or station. On a roller train according to German Laid Open Patent Appln. No. 32 15 921, each individual roller is driven in a complex and expensive fashion by a motor.

OBJECT OF THE INVENTION

The object of the invention is therefore to create an economical and reliable conveyor apparatus or roller train with a separation and storage function.

SUMMARY OF THE INVENTION

This object is accomplished by the invention in that each conveyor station of a roller train has its own drive motor with a switchgear unit, and that several switchgear units are connected together for control purposes as a cascade, whereby only the first switchgear unit of a cascade is connected to a higher-voltage switch cabinet. Regardless of whether the conveyor station is located at the beginning, middle or end of a cascade, the same switchgear units are preferably used. When installing each cascade, only one switchgear unit is connected to the switch cabinet. Each switchgear unit of the cascade functions as an individual drive. The number of switching elements in the switch cabinet is thereby significantly reduced, as is the cost of installation.

In an additional configuration of the invention, the switchgear units are an integral component of the conveyor station in question. There are standardized interfaces to the switchgear units of the conveyor stations immediately upstream and downstream. Each switchgear unit has a power portion including motor protection as well as a control part including a relay for the "occupied" signal. A diode logic is employed for the storage and separation function.

The cable connections within the cascades require a minimum amount of prewired cables, with one end being connected during the fabrication of the switchgear units. The connections for all the switchgear units are also consistently labelled, so that the installation can be made without constant reference to equipment circuit diagrams and without special knowledge of the system. All that is necessary is a simple connection diagram, which is preferably attached by adhesive to the cover.

The invention is provided in a preferred embodiment thereof including a conveyor apparatus for transporting articles. The conveyor apparatus includes a series of conveyor stations one after the other for transporting articles from an upstream conveyor station of the series to a downstream conveyor station of the series. Each of the downstream conveyor stations has an upstream conveyor station immediately adjacent thereto. Each of the upstream conveyor stations and each of the downstream conveyor stations has a conveyor, a motor for advancing the conveyor and a control system for operating the motor. Each of the control systems includes a sensor for sensing a predetermined condition of an article relative to the conveyor of the conveyor station of each of the control systems. The control system of each upstream conveyor station is for operating the motor of the upstream conveyor station in response to the sensor of the upstream conveyor station sensing the predetermined condition of an article relative to the conveyor of the upstream conveyor station. The control system of each downstream conveyor station is for operating the motor of the downstream conveyor station in response to the sensor of the downstream conveyor station sensing the predetermined condition of an article relative to the conveyor of the downstream conveyor station. There is included cabling for interconnecting the control system of each upstream conveyor station to the control system of its immediately adjacent downstream conveyor station. The control system of each upstream conveyor station can, through the cabling for interconnecting, also operate the motor of the upstream conveyor station in response to the sensor of the downstream conveyor station sensing the predetermined condition of an article relative to the conveyor of its immediately adjacent downstream conveyor station.

BRIEF DESCRIPTION OF THE DRAWINGS

The embodiments of the invention are illustrated in the drawings and are explained in detail below.

DESCRIPTION OF THE PREFERRED EMBODIMENTS

Figure 1:
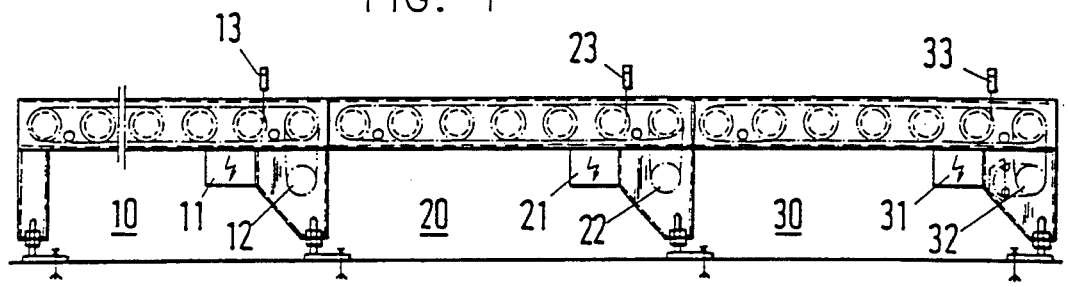
FIG. 1 shows a side view of a portion of a preferred storage roller train with three conveyor stations.
Figure 3:
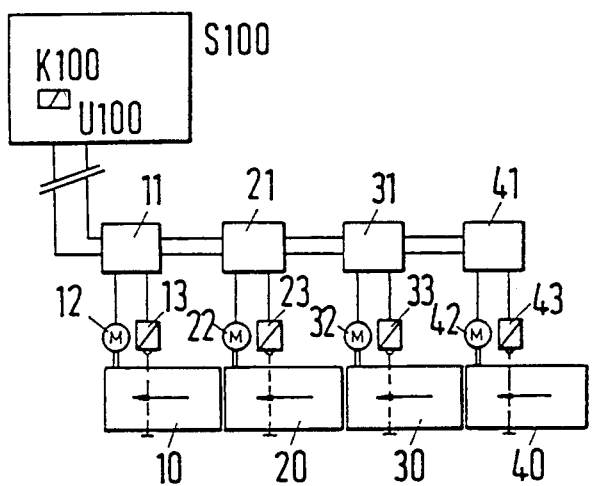
FIG. 3 is a schematic view of the preferred layout of a cascade consisting of four switchgear units of the type shown in FIG. 2.

A preferred conveyor apparatus or roller train segment, which is illustrated in FIG. 1, has storage or conveyor stations 10, 20 and 30 with drive motors 12, 22 and 32: with sensors 13, 23 and 33; and with switchgear units 11, 21, 31 which together form a cascade and are connected via the switchgear unit 11 to a remote switch cabinet S100 of the type shown in FIG. 3.

Figure 2:
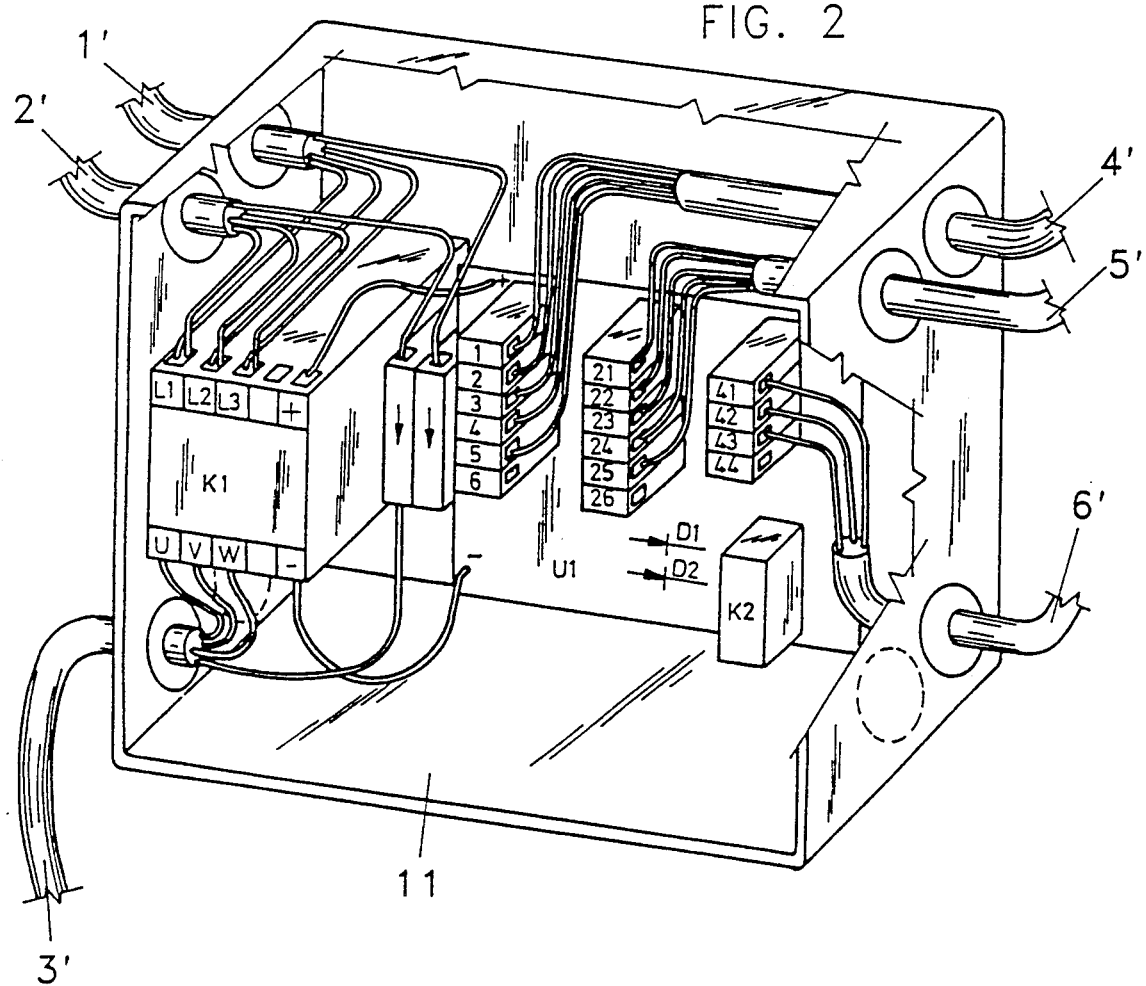
FIG. 2 shows a perspective view of a preferred switchgear unit of the type used in the storage roller train of FIG. 1 and the layout of FIG. 3.

In the switchgear unit 11 illustrated in FIG. 2, the cables are numbered 1' to 6'. As will be seen, the preferred switchgear unit 11 is identical to the switchgear units 21, 31 or 41 (FIG. 3). Cable 1' is the 380 V feed line from the switch cabinet S100 for switchgear unit 11 or from the next downstream switchgear unit for each other switchgear unit 21, 31, 41 to the feed power portion K1 thereof. Cable 2' is the 380 V connection from the feed power portion K1 to the next switchgear unit upstream. Cable 3' leads to the motor 12 associated with the switchgear unit 11 or, for the other switchgear units 21, 31, 41, to the particular associated motor 22, 32 or 42. The cable 4' is the 24 V control line, which comes either from the logic U100 of the switch cabinet S100 for switchgear unit 11 or from the next switchgear unit downstream for each other switchgear unit 21, 31, 41 and leads to the control portion U1 thereof. Cable 5' is the control line connection to the switchgear unit upstream. The cable 6' leads to the corresponding sensor 13, 23, 33 or 43 of each corresponding storage station 10, 20, 30, or 40.

The cables 1', 3', 4' and 6' are connected during fabrication of the switchgear unit. Cables 2' and 5' correspond to cables 1' and 4' respectively of the neighboring upstream switchgear unit and must be connected after installation of the conveyor system. The switchgear unit farthest upstream of a cascade does not have cables 2' and 5'. For each switchgear unit 11, 21, 31 and 41, the feed power portion K1, including a relay for an associated motor breaker K1', is connected with the control portion U1 of the switchgear unit by means of the + and − connections. The connection diagram in FIG. 2 (and/or the corresponding circuit diagram of FIG. 4) is attached by adhesive to the cover of each switchgear unit.

FIG. 3 shows the control system with the switchgear units in a cascade according to the invention. The switch cabinet S100 has a power portion K100 with logic U100 for a drive system. The switchgear units 11, 21, 31 and 41 are integrated into the conveyors and are connected to one another by standardized short lines. Only the switchgear unit 11 is connected with the switch cabinet S100. From the individual storage stations 10, 20, 30 and 40, the "occupied" signals perspectively travel via the sensors 13, 23, 33 and 43 to the switchgear units 11, 21, 31 and 41, in order to control the motors 12, 22, 32 and 42 for driving the support rollers on the storage stations 10, 20, 30 and 40. In the configuration of FIG. 3, the sensors are located so that the "occupied" signals will be produced when a forward portion of an article thereon has advanced through about two-thirds of the length of the conveyor station. When the motor is operated, the article would then be expected to travel about one-third of the length of the conveyor before being discharged for receipt of the next, downstream conveyor.

Figure 4:
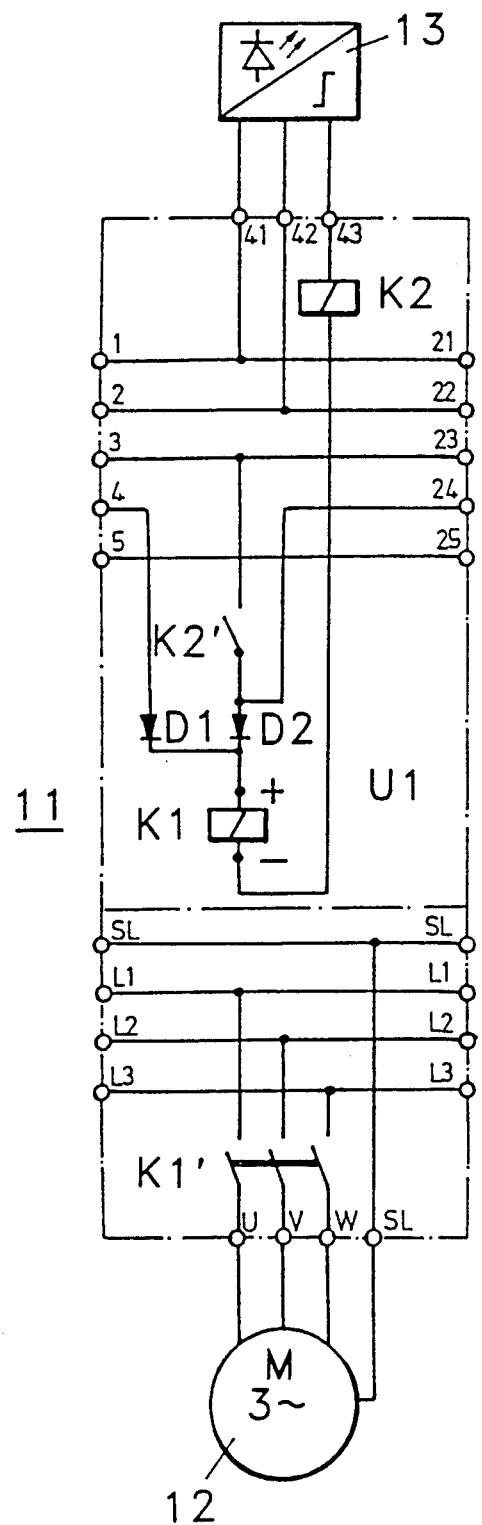
FIG. 4 is a circuit drawing of the circuitry of a switchgear unit of the type shown in FIG. 2.

FIG. 4 is a circuit drawing of the circuitry of a preferred cascade switchgear unit. The drive motor 12, 22, 32 or 42 runs when its corresponding storage station and/or the next storage station downstream is open.

If a storage station 10, 20, 30 or 40 itself is open, the relay K2 associated with the corresponding sensor 13, 23, 33 or 43 is operated. The contact K2' of this relay is thereby closed. From the input terminal 3 of the control portion U1, the current flows via the closed contact K2' and the diode D2 to the protection coil or relay K1 for the motor 12, 22, 32 or 42.

Alternatively, for stations 20, 30 or 40, if the station immediately downstream is free or open, voltage is applied to the terminal 4 of the logic U1 (from the terminal 24 of the logic U1 of the downstream switchgear unit) and, by means of the diode D1, engages the protection coil or relay K1. As long as the voltage to the relay K1 is equal to one, the motor 12, 22, 32 or 42 associated therewith runs. The higher-level logic U100 of the switch cabinet S100 must guarantee that the following signals reach the switchgear unit 11 via the cable 4':

Terminal 1 = Feed voltage +24 V
Terminal 2 = Reference potential 0 V
Terminal 3 = +24 V, as long as the cascade should run (when the storage conveyor is on)
Terminal 4 = +24 V, as long as the storage conveyor is intended to discharge merchandise to the subsequent conveyor (downstream).

By means of terminal 5, the switch cabinet S100 determines that the storage conveyor is not completely full.

Figure 5:
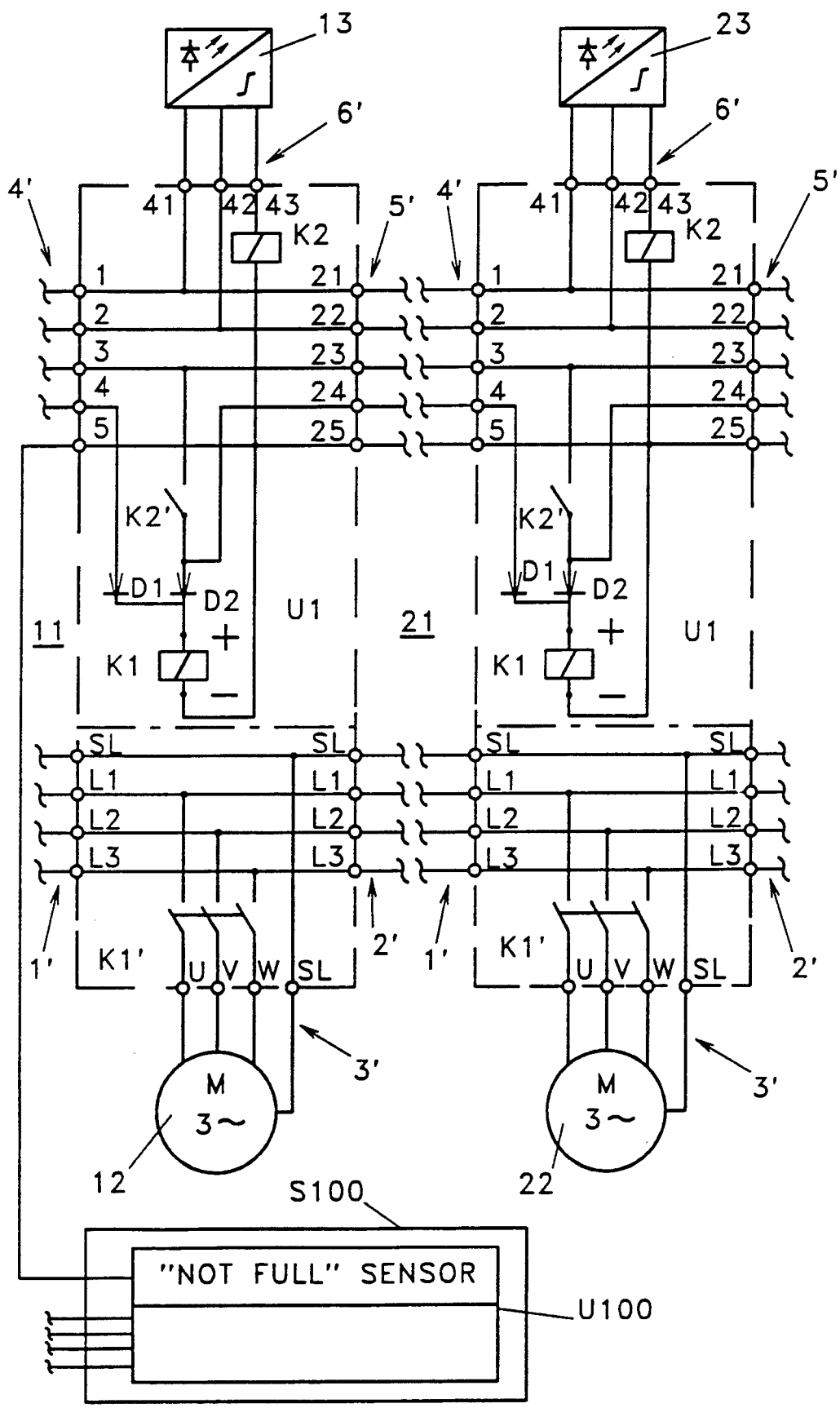
FIG. 5 is a circuit drawing of the circuitry of two adjacent switchgear units similar to that of FIG. 4 including other features of the invention.

As seen in FIG. 5, the circuit diagrams of switchgear units 11 and 21 demonstrate the relationships between two adjacent switchgear units and other features of the invention. Specifically, the cable 5' of switchgear unit 11 is connected to form the cable 4' of the switchgear unit 21. Further, the cable 2' of switchgear unit 11 is connected to serve as cable 1' of the switchgear unit 21. Additionally, it should be noted that if either of the sensors 13 or 23 indicates that the conveyor station thereof is open, current through the relay K2 of its corresponding switchgear unit 11 or 21 will provide current to all of the terminals 5, 25. The current provides a signal through the connecting lines back to a "not full" sensor, which may be part of the logic U100, in the switch cabinet S100. Accordingly, it can be seen that activation of any one of the lines 5, 25 will occur if any one of the sensors in the conveyor apparatus is indicating that its particular conveyor station is open. Such a "not full" sensor may, for example, be employed to indicate to those upstream of the conveyor apparatus that a demand for new articles, for eventual supply to the upstream conveyor station, exists.

More significantly, FIG. 5 demonstrates the relationship between the upstream switchgear unit relative to the downstream switchgear unit and the manner in which sensing at the downstream station can effect the operation of the upstream station. If the sensor 13 of the downstream station 10 indicates that the conveyor thereof is "not full", the relay K2 will cause the contact K2' to be closed to produce a flow of current from terminal 3, 23 through the diode D2, in the manner as described hereinabove, to cause operation of the motor 12. Additionally, the current will flow to the terminal 24 and eventually through the connecting cables 5', 4' to the terminal 4 of the switchgear unit 21. With current provided to the terminal 4, current will flow through diode D1 of the switchgear unit 21 to activate the relay K1 for closing the motor breaker K1' of motor 22 of the station 20. Accordingly, it can now be clearly seen how the operation of station 20 can be alternatively produced by either the sensor 23 indicating that the conveyor of station 20 is not occupied or by the sensor 13 indicating that the conveyor of the downstream station 10 is not occupied.

Figure 6:
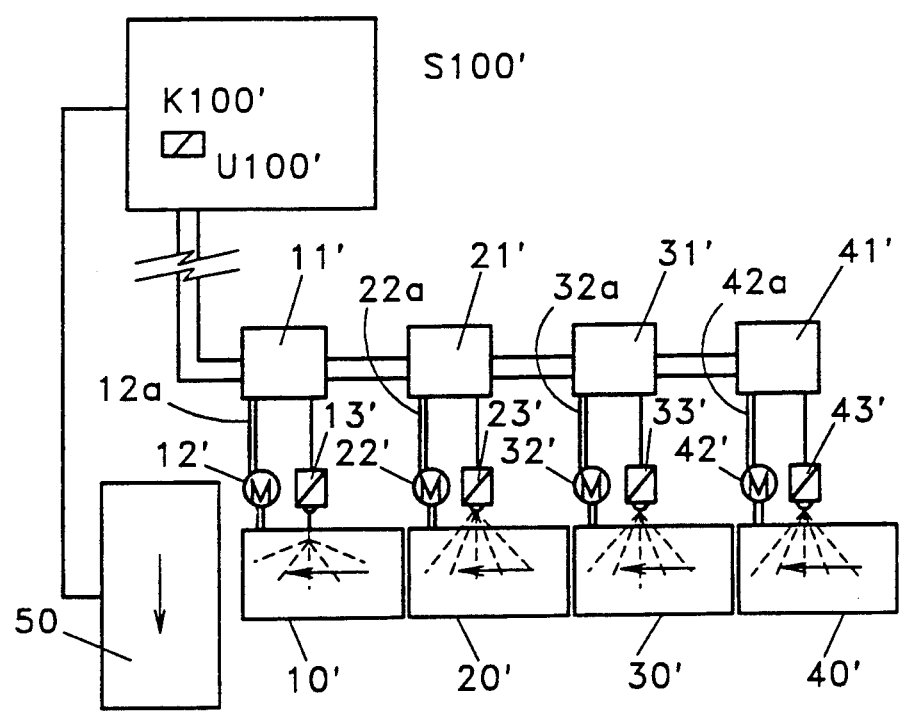
FIG. 6 is a schematic view of another layout of a cascade consisting of four alternative switchgear units including various features of the invention.

As seen in FIG. 6, an alternative conveyor apparatus may include an alternative switch cabinet S100' with a power portion K100' and logic U100' thereof. With such an alternative configuration, each of the switchgear units 11', 21', 31', 41' may be configured to sense different items with respect to the particular conveyor stations 10', 20', 30', 40' thereof. For example, there may be a concern that any one of the motors 12', 22', 32', 42' of the conveyor stations 10', 20', 30', 40' is not properly running. Accordingly, the switchgear units 11', 21', 31', 41' may include respectively appropriate connections and sensors 12a, 22a, 32a, 42a for indicating when the motor thereof is not properly running. A signal from any of the sensors 12a, 22a, 32a, or 42a could again be received at the switch cabinet S100' in a similar manner as the "not full" signal described hereinabove.

Still further, the various switchgear units 11', 21', 31', 41' may be configured, according to the particular operation of the preferred conveyor stations, to have one or more different types of sensors 13', 23', 33', 43'. For example, as seen in FIG. 6, the particular sensors may be motion sensing devices or sensors for indicating that the conveyor is moving and occupied or that the articles thereon have been completely discharged. Any number of such sensors can be designed into a standard switchgear unit 11', 21', 31', 41' in order to provide an overall operation of the various conveyor stations depending on the particular article to be conveyed thereby and the particular manner of conveying desired.

As seen in FIG. 6, the alternative switch cabinet S100' may, for example, be configured to operate in conjunction with another conveyor device 50 which is at the end of the conveyor apparatus including the various conveyor stations as discussed hereinabove. In such a situation, the switch cabinet S100' may include pre-set orders or controls for movement of the conveyor 50 which could include separate sensing. The sensing may be used to indicate that the portion of the conveyor 50 at the discharge of the conveyor station 10' is "open" in order to be able to receive articles which are discharged from the conveyor station 10'. In such a case, the switch cabinet S100' would be capable through the logic U100' to provide a signal to the switchgear unit 11' for activation and operation of the motor to cause the conveyor of conveyor station 10' to direct the articles thereof onto the conveyor 50. With such a configuration, the switchgear unit 21' of the next upstream conveyor station 20' may be directed by the sensor 13' of the switchgear unit 11', when the articles on the conveyor station 10' begin to move, to cause the motor 22' to be activated for the advancement of articles toward conveyor station 10'.

Additionally, it can now be seen, from the discussion hereinabove regarding the "not full" sensor of FIG. 5, that such a conveyor apparatus as shown in FIG. 6 might include an overall shut-down feature, for example, if one of the motors appears to be functioning improperly through any one of the motor sensors 12a, 22a, 32a, 42a.

Although the examples provided hereinabove are primarily directed to a conveyor apparatus including various means for intermittently operating the conveyor stations upon demand for supply to the next conveyor station thereof, it should be clear to those skilled in the conveying art that other configurations including different relationships between adjacent conveyor stations could also be employed while using a similar series of identically configured switchgear units. Such identical switchgear units would require a minimum number of interconnections for a simple and less expensive overall operation than would be required if one primary control circuitry were needed to directly operate all of the various conveyor stations.

In summary, the present invention includes a preferred roller train with a series of conveyor stations, one after the other, whose support rollers can be optionally driven or shut off. The invention is characterized by the fact that the support rollers of every conveyor station 10, 20, 30, 40 have their own drive motors 12, 22, 32, 42 with corresponding switchgear units 11, 21, 31, 41 and the several switchgear units are connected for control purposes into a cascade. Only the first switchgear unit of a cascade is connected to a higher-voltage switch cabinet S100.

The roller train is further characterized by the fact that the switchgear units 11, 21, 31, 41 are an integral part of the conveyor station in question, with standardized interfaces with the switchgear units of the conveyor stations immediately upstream and downstream.

The roller train is also characterized by the fact that each switchgear units 11, 21, 31, 41 has a power portion, consisting of a motor protection coil or relay K1 and a control portion U1 with a relay K2 for the "occupied" signal with a diode logic D1, D2 for the storage and separation functions.

The roller train can also be characterized by the fact that each switchgear unit 11, 21, 31, 41 is equipped during fabrication with standardized cables for the power feed, control line, motor connection and "occupied" sensor 13, 23, 33, 43.

The roller train can be characterized by the fact that each switchgear unit 11, 21, 31, 41 may have additional terminals for one or more additional functions, such as, motor monitoring, motion sensing, station occupation and discharge, and that the connection to the higher-voltage switch cabinet S100 is made by way of the switchgear unit 11 at the beginning of the cascade.

Various types of sensors may be employed in the preferred conveyor apparatus in order to provide proper sensing for one of the types of operation as discussed hereinabove. Specifically, sensors of the types as generally shown in U.S. Pat. Nos. 4,439,728; 4,629,982; 4,633,148; 4,688,025; 4,782,701; and 4,820,938 may be employed in conjunction with appropriate switchgear units. These and other patents mentioned above are incorporated by reference as if included in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A conveyor apparatus for transporting articles, said conveyor apparatus comprising:
    a plurality of conveyor stations disposed serially, one after the other for transporting articles from an upstream one of said plurality of conveyor stations to a downstream one of said plurality of conveyor stations;
    each of said downstream conveyor stations having an upstream conveyor station immediately adjacent thereto;
    each of said plurality of conveyor stations having an associated conveyor, an associated motor for advancing said conveyor, and associated control means for operating its associated motor;
    each of said associated control means of said plurality of conveyor stations including sensing means for sensing a predetermined condition of an article relative to its associated conveyor;
    said associated control means of each said upstream conveyor station having means for operating the associated motor of said upstream conveyor station in response to said sensing means of said upstream conveyor station sensing said predetermined condition of an article relative to said associated conveyor of said upstream conveyor station;

said associated control means of each said downstream conveyor station having means for operating the associated motor of said downstream conveyor station in response to said sensing means of said downstream conveyor station sensing said predetermined condition of an article relative to said associated conveyor of said downstream conveyor station; and means for interconnecting said associated control means of each said downstream conveyor station to the associated control means of its immediately adjacent upstream conveyor station; and said control means of each said upstream conveyor station having additional means, through said means for interconnecting, for operating said motor of said upstream conveyor station in response to said sensing means of said downstream conveyor station sensing said predetermined condition of an article relative to the associated conveyor of said downstream conveyor station;

each of said control means of each of said downstream conveyor stations comprising limited control means for controlling solely both of the following:

its own associated conveyor; and the associated conveyor of the upstream conveyor station immediately adjacent thereto;

each of said control means of each of said downstream conveyor station further having logic means for operating both said associated motor of said downstream conveyor station and the associated motor of said upstream conveyor station immediately adjacent to the downstream conveyor in response to the sensing of both the predetermined condition of an article on said associated conveyor of said downstream conveyor station and the predetermined condition of an article on said associated conveyor of said upstream conveyor station immediately adjacent its associated downstream conveyor;

each of said sensing means for sensing said predetermined condition of an article including means for indicating if an article is on the associated conveyor;

each of said sensing means for sensing said predetermined condition of an article including means for indicating that an article has been discharged from the associated conveyor and that the associated conveyor is free of an article;

said logic means being for providing a first signal from said sensing means of said upstream conveyor station indicating said predetermined condition thereof and being for providing a second signal from said sensing means of said downstream conveyor station indicating said predetermined condition thereof; and the control means of each of said downstream conveyor stations including means for running the associated conveyor of the upstream conveyor of two immediately adjacent conveyors stations if the immediately downstream conveyor of the two immediately adjacent conveyor stations is free of an article, and said each of said control means are identical and includes a switchgear unit, said means for interconnecting includes at least a power cable means and at least one control cable means, said switchgear unit includes motor cable means for connecting to said motor, and said switchgear unit includes at least one sensor cable means for connecting to said sensing means; and each of said switchgear units are preassembled, said preassembled units including said power cable means, said control cable means, said motor cable means and said sensor cable means connected thereto.

* * * * *